United States Patent [19]
Murphy et al.

[11] 3,798,024
[45] Mar. 19, 1974

[54] RECLAMATION OF ALUMINOUS SKIM

[75] Inventors: Alfred M. Murphy; Kenneth C. Hagerman, both of Richmond; Nicholas A. Wagner, Chester, all of Va.

[73] Assignee: Reynolds Metals Company, Richmond, Va.

[22] Filed: July 13, 1972

[21] Appl. No.: 271,411

[52] U.S. Cl. .................................. 75/68 R, 75/24
[51] Int. Cl. ............................................ C22b 21/00
[58] Field of Search ............................. 75/68 R, 24

[56] References Cited
UNITED STATES PATENTS

| | | | |
|---|---|---|---|
| 1,550,192 | 8/1925 | Wild | 75/68 R |
| 3,649,247 | 3/1972 | Brondyke et al. | 75/68 R |
| 2,481,591 | 9/1949 | Heilman et al. | 75/68 R |
| 2,754,199 | 7/1956 | Stroup et al. | 75/68 R |
| 3,043,678 | 7/1962 | Lowry et al. | 75/24 |

Primary Examiner—L. Dewayne Rutledge
Assistant Examiner—M. J. Andrews
Attorney, Agent, or Firm—Glenn, Palmer, Lyne & Gibbs

[57] ABSTRACT

Skim or dross material formed on a body of molten aluminum or aluminum alloy is treated to recover aluminous metal by removing the hot skim material to a preheated skim pot, introducing previously melted salt flux, stirring the flux and skim so as to admix them thoroughly, and recovering molten metal separated from the residual skim solids.

9 Claims, No Drawings

RECLAMATION OF ALUMINOUS SKIM

BACKGROUND OF THE INVENTION

The present invention is concerned with the reclamation of aluminous metal from the skim or dross which is produced during the melting of aluminum and its alloys. This skim is a viscous, mushy or powdery material that floats on the surface of an aluminous metal melt, and is of variable composition, including oxides, nitrides, and other nonmetallic compounds. Considerable quantities of aluminous metal are entrained in the skim, ordinarily as much as 40 percent to 95 percent by weight, and this represents a considerable loss of metal from the original melt.

Conventional methods of skim processing involve physical removal of the skim from the melt surface by mechanical means, followed by secondary treatment to reclaim as much of the aluminous metal content as possible.

The handling of the skim in the metal melting or holding furnace has a direct influence on the extent of subsequent recovery of aluminous metal from the skim. When a sufficient layer of skim has accumulated on the melt, it must be removed promptly, not only so that the melting may continue, but more importantly, to minimize or prevent oxidation of the entrained metal.

Skim formation on a melt surface apparently commences as a result of oxide in the original charge floating to the surface with adhering metal. In this original state relatively little oxidation is taking place, and the layer on the melt may contain as much as 95 percent metal. If heat is supplied through this layer, the layer acts as a barrier to heat transfer and its temperature increases. Oxidation begins to increase and changes in physical form can be noted. Oxidation is promoted by the presence of air or products of combustion in an open hearth furnace. Hot molten aluminum skim will combine preferentially with oxygen to form oxides, but reactions can proceed with nitrogen to form nitrides and with carbon dioxide to form oxides and carbides.

As heating proceeds, the original wet mushy skim can change to a powdery form, in which the aluminum appears to form droplets with powdered nonmetallic materials on the surface. This latter physical form has a higher oxidation rate than the wet mushy form. As these reactions are highly exothermic and increase with temperature and mass of the layer, they can quickly get out of control and a reaction known as thermiting takes place. Thermiting results in a rapid loss of metal through oxidation and it is difficult to control.

Skim can also be generated as the result of metal transfer operations. Such skim is generally of the wet mushy type but it behaves similarly to skim originating from melting. Skim can also be generated from fluxing with gases such as chlorine, chlorine-nitrogen or other gases used for metal cleanliness purposes. These operations themselves may ignite the skim giving further oxidation.

In aluminum melting one would like to generate the least amount of nonmetallic material and separate as much metal as possible in the unoxidized state from the skim itself. Such operation is easy to recognize in theory but somewhat more difficult to practice. Variations in skim composition and consistency are bound to occur so the ideal method of treatment is one which not only operates effectively under optimum practices but also gives acceptable recoveries with variations from optimum.

In the past, thermiting has been employed intentionally to separate aluminum metal from skim. While thermiting occurs as the result of igniting molten aluminum and using it as a fuel, such burning can be used to separate molten aluminum from a mass of skim, particularly when combined with some form of agitation. Thermiting may be induced by the use of a solid ignition salt flux. Mixtures such as 75 percent sodium chloride-25 percent cryolite, anhydrous aluminum chloride, or proprietary compositions containing an active fluoride are generally employed. Gaseous chlorine may be introduced into the melt below the skim layer in conjunction with such thermiting treatment.

It has been proposed, in one prior art approach, to handle the skim so as to induce and maintain thermiting or burning under controlled conditions by working the skim in an inclined rotary barrel open to the atmosphere, under oxidizing conditions, thus permitting a certain proportion of the metal content to be consumed, in order to recover the rest. This method has the drawbacks of being technically complicated to operate, and of causing voluminous fumes during tumbling of the thermiting skim.

In a subsequent development, the method was modified by covering the rotary barrel and introducing gaseous chlorine to provide an inert aluminum chloride vapor atmosphere. However, with this method, when the cover is removed, a thermiting residue is exposed to the air, creating fume control and safety problems even more acute than those encountered using an open barrel.

A more recent development has been the rotary salt flux furnace process, which is believed to be presently in use, and which involves placing the aluminous skim or dross inside a rotary barrel furnace, and then adding a predetermined amount of a salt flux in solid form. The furnace is then rotated at a suitable rate of speed to obtain a tumbling or cascading action of the mixture of dross and solid flux to break up large lumps of dross. Heat is then applied to the mixture by means of an oil or gas burner effective to liquefy the flux. After the flux has liquefied, the mixture is subjected to a gentle rolling action at a lower speed of rotation, during which the recoverable molten metal is separated from the dross. The flux is preferably a eutectic mixture of about 55 percent potassium chloride and 45 percent sodium chloride, to which from 2.5 percent to 5 percent of cryolite or other fluoride may be added to promote oxide removal from the metal particles. This method has the disadvantages of applying the burner flame directly to the flux, thus presenting a possible source of air pollution, and also requiring a rather high proportion of flux, amounting to about 50 percent by weight of the skim. The installation of the rotary furnace also represents a considerable capital investment.

Accordingly, what the art has sought is an efficient method of recovering aluminous metal from skim or dross which would require only a low capital investment, and which would consume substantially smaller quantities of processing chemicals, while at the same time keeping the volatilization of flux constituents at a minimum.

GENERAL DESCRIPTION OF THE INVENTION

In accordance with the present invention, there is provided an improved method for the reclamation of aluminous metal from skim or dross, which results in high metal recovery efficiencies, which is flexible enough to produce good results under a wide variety of operating conditions, which brings about a substantial reduction in melting metal losses, and which reduces undesirable effluents.

The novel method of the invention is based on the principle of molten salt flux stirring. The aluminous metal recoveries, which this principle makes possible, equal or exceed those of the recovery methods of the prior art. The use of costly auxiliary equipment, such as rotary furnaces and barrels, is eliminated. Once the skim is transferred to a suitable pot or container, it can remain in the same vessel for subsequent processing, and no transfers of material are necessary other than tapping of the separated metal, and dumping of the residue.

The process of the present invention involves a first step of removing hot skim material which has accumulated on the exposed surface of the molten metal in a melting furnace, in order that melting may continue. This may be done advantageously, for example, by means of a large hoe-like tool suspended from a suitable means for moving the tool, for example, a forklift truck.

The skim is transferred into a thoroughly preheated skim pot or container, typically one having a castable refractory lining, which may be so arranged as to provide a hemispheric cavity to hold the skim. The skim remains in this container or pot throughout the metal recovery treatment. The pot may be of any desired capacity, for example, holding about 1000 pounds of skim.

The skim is removed from the melt while as hot as possible, but preferably before ignition or thermiting occurs. However, an advantage of the present invention is that its use of preheated molten salt, as hereinafter described, helps to avoid premature solidification of the skim charge, making it possible to handle skim which otherwise might freeze during subsequent processing.

Desirably, the aluminous metal which may separate preliminarily in the skim pot may be poured off into a separate container, such as a pig mold, reducing the burden on the recovery operation, and also providing additional space for the subsequently added charge of molten salt flux.

The next step in the practice of the invention is that of introducing molten salt flux over the charge of hot skim in the skim pot. The solid salt flux is preheated separately at least to substantially liquid condition in the temperature range of about 1,200°–1,600°F., preferably to a superheated condition at about 1,400°–1,600°F., typically 1,500°F., before adding it to the skim pot. This melting and preheating of the flux may take place in any suitable type of melting apparatus, such as a cast iron crucible positioned in a crucible-type furnace or, preferably, an electrical resistance salt melting furnace of the type commonly used for heat treating or brazing.

The molten salt flux is then stirred into the molten skim in the skim pot by the application of suitable stirring means. A suitable unit includes, for example, a pair of inserted paddles, turning at about 50 to 60 rpm in opposite directions, driven through a clutch arrangement which provides release in case hard lumps or crusts are encountered. In this arrangement the pot may be rotated slowly at about one rpm. The paddles may be roughly contoured to the shape of the pot, with, for example, a center paddle reaching the lower center portion of the pot and an outer paddle stirring the skim at the upper edge. Alternatively, the pot can remain stationary and/or a large, single contoured paddle may sweep through its contents.

Stirring should be continued until the mass has been thoroughly mixed, thereby effecting separation of metal in the bottom of the skim container. A period of about 5 minutes has generally proved satisfactory, but longer or shorter times may be employed. The container may be covered during stirring if desired, to conserve heat, but does not have to be fully enclosed or sealed.

After the stirring operation has been completed, the remaining metal which has separated is poured off or tapped, into a suitable receiver, such as a pig mold. The residue is then dumped from the pot, cooled, and either discarded or further processed for recovery of metal values or salt flux, or both.

It will be appreciated that other modes of operation also can be employed, for example, the first pour prior to adding the molten flux can be omitted, also, tapping and recovery of metal may proceed during the stirring operation.

It is particularly desirable that the temperature of the molten flux, and the initial temperatures of the preheated skim pot and of the charge of skim material placed therein, be effective to maintain the separated aluminum in molten condition throughout the stirring and recovery operations, without the necessity of heating the skim pot or its contents after the addition of the flux.

The initial temperature of the skim pot contents (and of its temperature subsequently during stirring) will ordinarily be in the range of about 1,200°F. to 1,600°F., depending to some extent on the flux composition and other operational factors. The amount of molten flux required is on the order of about 200 to 300 pounds per 1,000 pounds of skim, typically about 250 pounds, again depending upon the particular flux composition. This amount is only about one-half that apparently required in the prior art rotary salt flux furnace process, and this is an important advantage of the process of the present invention.

The salt composition employed as a flux, in accordance with the invention, is advantageously a mixture of sodium chloride and potassium chloride in which the proportion of sodium chloride, by weight, is typically at least about 50 percent, and preferably a eutectic mixture in which the melting temperature will be a minimum. There is advantageously included in the salt flux a minor proportion of an alkali metal, alkaline earth metal or aluminum fluoride, or a combination thereof, such as cryolite. The fluoride serves to aid in separation of the aluminous metal. The proportion of cryolite may range from about 1 percent to 10 percent, but 5 percent by weight is generally preferable. Thus, a suitable salt flux composition for use in the method of the invention consists essentially, by weight, of approximately 50 percent NaCl, 45 percent KCl, and 5 percent cryolite. An advantage of using water soluble flux components is their ease of separation and recovery from the pot residues.

The use of a preheated molten salt flux, in conjunction with the stirring operation, not only serves to increase the amount of aluminous metal recovered, but by surrounding the metal so as to exclude air it also suppresses the tendency of the molten skim toward oxidation, burning or thermiting, which would otherwise consume metal which would be lost with the residue. At the same time the salt flux cover serves to minimize the emission of fumes from the pot, and thus to reduce air pollution problems. The stirring action permits better contact of the flux with the skim in the viscous molten mass, and thus permits the use of much less salt flux.

After separation of molten aluminous metal from the skim in the pot, the residue is discarded and allowed to cool. It may still contain as much as 15 percent to 20 percent or more metal, which can be recovered by further processing. While the discharge of residue is accompanied by some fume generation, the volume is greatly diminished, and the discarding operation is now essentially safe from the problems incident to dumping thermiting skim.

DESCRIPTION OF THE PREFERRED EMBODIMENTS

The following examples are intended to illustrate the practice of the invention, but are not to be regarded as limiting:

Example 1

Utilizing the equipment previously described, about 1,160 lbs. of skim were removed from a body of molten 6,061 aluminum alloy in the holding furnace, and transferred to a skim pot previously heated to 1,500°F. An amount of salt flux was melted, said flux having the composition 50 percent NaCl, 45 percent KCl, and 5 percent cryolite, by weight. Of this melt, 236 pounds were added to the material in the skim pot. Of the total metallic aluminum in the original skim charge (765 lbs.), 653 lbs. or about 85 percent was recovered. The weight of residue plus flux was 748 lbs., and the weight of metal in the residue was 112 lbs., or 15 percent.

Example 2

A considerable number of test runs utilized the NaCl-KCl eutectic flux, either as such or with varying amounts of cryolite, in the treatment of skim derived from the melting of 6,000 series alloys. The results of these tests are summarized in Table 1:

What is claimed is:

1. In the treatment of skim material comprising dross formed on the surface of a body of molten aluminum, or aluminum base alloy, to effect separation and recovery of aluminous metal from said skim material in the presence of a salt flux consisting essentially of sodium chloride and potassium chloride, or a mixture of said chlorides with a fluoride of aluminum, an alkali metal, an alkaline earth metal, or a combination thereof, the method which comprises:
   a. removing the hot skim material from said body of molten aluminous metal;
   b. placing a charge of the skim material in a preheated skim pot;
   c. introducing said flux to the charge in said pot, including preheating the flux at least to substantially liquid condition before adding it to the pot;
   d. thoroughly mixing said skim material and molten flux; and
   e. recovering molten aluminous metal separated from the residual solids in said pot;

said preheating of the flux, and the respective initial temperatures of said pot and the charge of skim material placed therein, being effective to keep the separated aluminum in molten condition during said stirring and recovering operations without the necessity of heating said pot or its contents after adding the flux.

2. Method for the recovery of aluminous metal from skim material comprising dross formed on the surface of a body of molten aluminum or aluminum base alloy, comprising the steps of:
   a. removing the skim material from said molten metal surface to a preheated container;
   b. introducing molten salt flux over the skim material in said container;
   c. stirring said skim material and molten flux for a period of time sufficient to cause separation of aluminous metal from the mixture; and
   d. recovering the molten aluminous metal, the initial temperature of the skim material and the skim container being sufficient to keep the separated alumi-

TABLE I

SUMMARY MOLTEN SALT FLUX STIRRING

| Test Conditions | Wt. of Skim Pounds | Aluminum Recovered Pounds | Aluminum Recovered % | Residue including salt Pounds | Residue including salt % | Salt Flux Added Pounds | Salt Flux Added % | Non-Metallics Plus Aluminum In Residue Pounds | Non-Metallics Plus Aluminum In Residue % |
|---|---|---|---|---|---|---|---|---|---|
| Potassium chloride-sodium chloride eutectic plus 5% Cryolite at 1450–1500°F | 28,635 | 15,740 | 55.0 | 21,307 | 74.4 | 8,422 | 29.4 | 12,895 | 45.0 |
| 31 treatment average | 924 | 508 | | 688 | | 272 | | 416 | |
| Maximum recovery | 606 | 403 | 66.5 | 434 | 71.6 | 231 | 38.1 | 203 | 33.5 |
| Minimum recovery | 1,045 | 440 | 42.1 | 858 | 82.1 | 253 | 24.2 | 605 | 57.9 |
| Potassium chloride–sodium chloride eutectic plus 10% sodium fluoride at 1450–1500°F | 7,242 | 3,802 | 52.5 | 5,778 | 79.9 | 2,338 | 32.3 | 3,440 | 47.5 |
| 7 treatment average | 1,033 | 543 | | 825 | | 334 | | 492 | |
| Maximum recovery | 1,370 | 805 | 58.7 | 915 | 66.8 | 350 | 25.5 | 565 | 41.2 |
| Minimum recovery | 873 | 394 | 45.1 | 817 | 93.6 | 338 | 38.7 | 479 | 54.5 |
| Potassium chloride-sodium chloride eutectic plus 1.7% Cryolite at 1450–1500°F — 2 treatments | 2,217 | 1,236 | 56.8 | 1,612 | 72.8 | 631 | 28.5 | 981 | 44.2 |
| Potassium chloride-sodium chloride eutectic only at 1450–1500°F — 2 treatments | 1,917 | 1,002 | 52.3 | 1,423 | 74.2 | 508 | 26.5 | 915 | 47.7 | num in molten condition during stirring and metal recovery.

3. The method of claim 2 in which the salt flux consists essentially of a mixture of sodium chloride and potassium chloride.

4. The method of claim 3 in which said salt mixture is substantially a eutectic mixture.

5. The method of claim 3 in which said salt mixture further includes a member selected from the group consisting of cryolite, aluminum fluoride, an alkaline earth metal fluoride and an alkali metal fluoride, and a combination of at least two such members.

6. The method of claim 2 in which the salt flux consists essentially of approximately 50 percent sodium chloride, 45 percent potassium chloride and 5 percent cryolite, by weight.

7. The method of claim 2 in which the skim container contents are maintained at a temperature between about 1,200° and about 1,600°F.

8. The method of claim 1 in which the molten flux is preheated to a temperature from about 1,400°F. to about 1,600°F.

9. The method of claim 1 in which the proportion of salt flux to skim material is between about 20 percent and about 30 percent by weight.

* * * * *